UNITED STATES PATENT OFFICE.

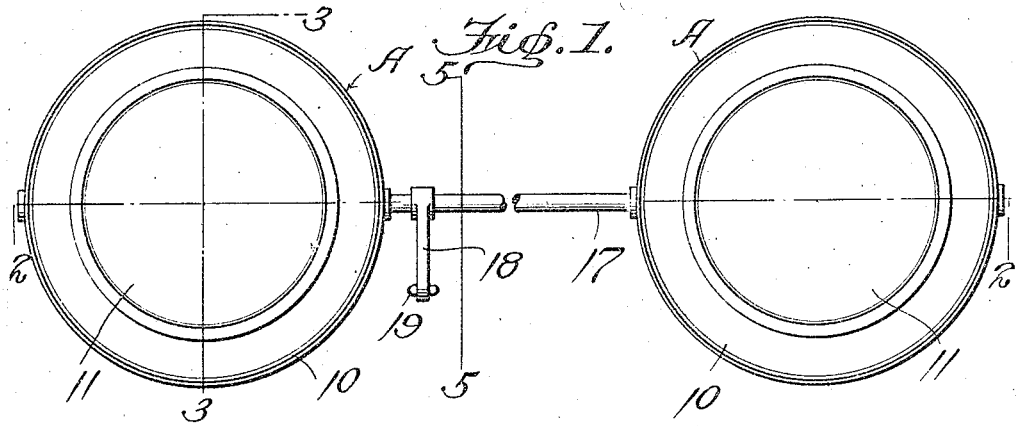
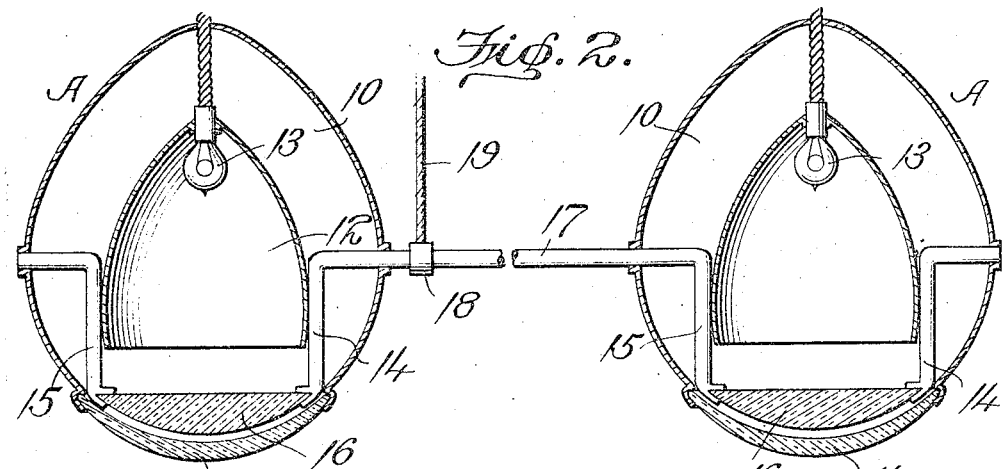
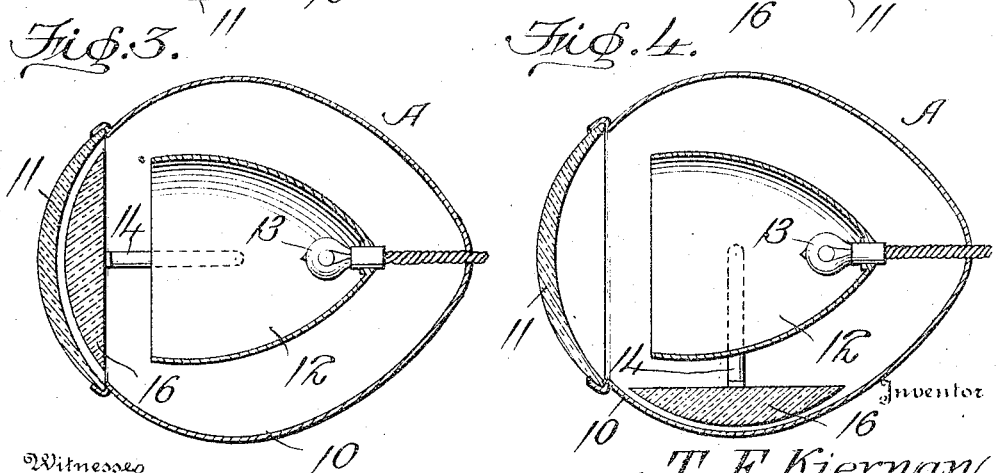

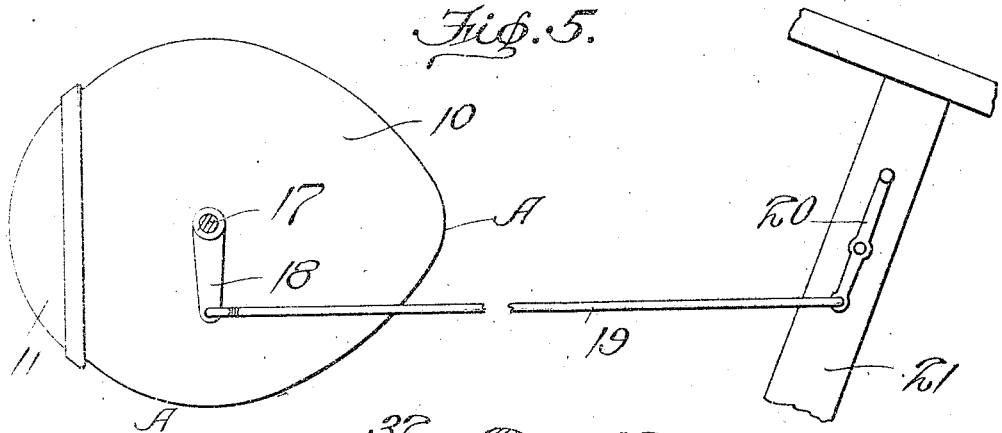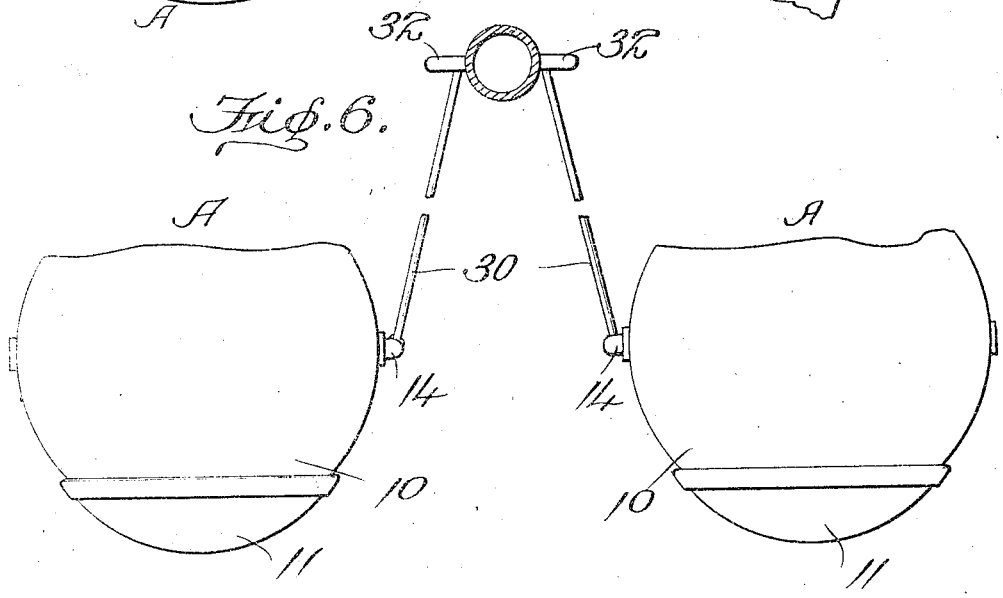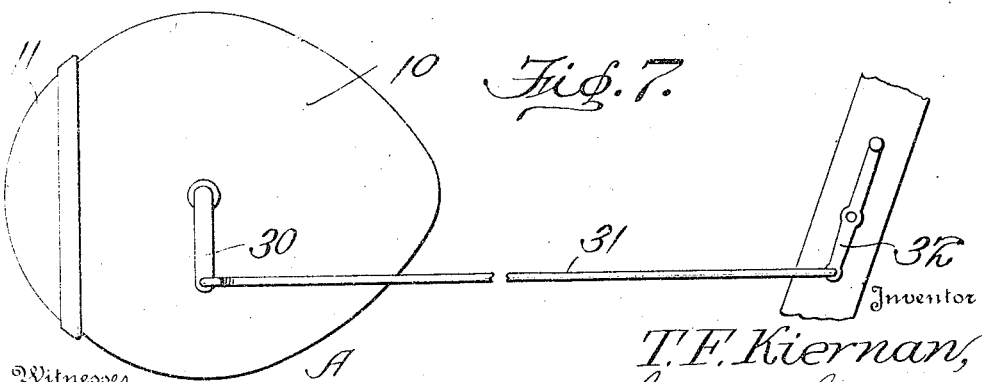

THOMAS F. KIERNAN, OF SALIDA, CALIFORNIA.

HEADLIGHT-DIMMER.

1,230,304.

Specification of Letters Patent.

Patented June 19, 1917.

Application filed July 7, 1916. Serial No. 107,977.

*To all whom it may concern:*

Be it known that I, THOMAS F. KIERNAN, a citizen of the United States, residing at Salida, in the county of Stanislaus, State of California, have invented certain new and useful Improvements in Headlight-Dimmers; and I do hereby declare the following to be a full, clear, and exact description of the invention, such as will enable others skilled in the art to which it appertains to make and use the same.

This invention relates to head light dimmers for automobiles or other vehicles.

The object of the invention is to provide an improved structure whereby the lights of an automobile may be dimmed or subdued at the will of the operator, said structure being simple and embodying comparatively few parts and being capable of incorporation without unduly enlarging the lamps or destroying their artistic appearance.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a front view of a pair of automobile lamps having the improved dimmer associated therewith;

Fig. 2, a section on the line 2—2 of Fig. 1;

Fig. 3, a section on the line 3—3 of Fig. 1;

Fig. 4, a view similar to Fig. 3 with the dimmer in inactive position;

Fig. 5, a section on the line 5—5 of Fig. 1 showing the lever mechanism for simultaneously controlling the dimmers;

Fig. 6, a plan view of a modified form of construction for controlling the dimmers, and Fig. 7, a view looking at the inner side of one of the lamps shown in Fig. 6.

Referring to the drawings A indicates the automobile lamps each of which embodies an outer body portion 10 and a lens 11. Each lamp A further embodies a reflector shell 12 mounted in the body 10 and spaced from the latter. Mounted in this shell 12 is a suitable lamp 13. Pivotally mounted in the body 10 between the latter and the shell 12 and at diametrically opposite points on said body are arms 14 and 15 which support a dimmer lens 16, said lens being constructed of material having the necessary opaque qualities. The pivots of the arms 14 are connected by a control bar 17 connecting the lamps A and this bar has mounted thereon in a fixed manner an arm 18. The free end of this arm has secured thereto one end of a cable 19 and the other end of this cable is connected to a lever 20 pivoted on the steering column 21 and through the manipulation of which the bar 17 can be rotated to move the dimmers 16 from inactive to active position. It will be noted that the dimmers 16 are normally held in inactive position by gravity and will automatically assume such position when the lever 20 is released. If desired the lever 20 can be partially operated so as to position the dimmers to partially shield the lamps. In mounting the dimmer and forming the adjacent parts it is necessary to construct the reflector shell 12 relatively deep which is an advantage in that a reflector so constructed condenses the light and throws it directly ahead of the machine with practically no rays directed to the side of the machine.

In the modified form of the invention the bar 17 is dispensed with and the pivots of the arms 14 provided with arms 30 respectively. Cables 31 are connected to these arms 30 and then connected respectively to levers 32 pivoted on the steering column. This construction will permit the dimmers of respective lights to be operated independently.

What is claimed is:—

1. The combination of a lamp including a body portion having a lens included in its wall, a reflector shell within the body portion and spaced from the latter, and a dimmer member pivoted to the body portion and constantly confined within same, said dimmer member being movable between the body portion and the reflector shell.

2. The combination of a lamp including a body portion having a lens, a reflector shell within the body portion and spaced from the latter, a dimmer member pivoted to the body portion and constantly confined within same, and means for moving the dimmer member to a position between the reflector shell and the lens.

In testimony whereof, I affix my signature, in the presence of two witnesses.

THOMAS F. KIERNAN.

Witnesses:
 A. C. BURBANK,
 J. W. ANDERSON, Jr.